US011048718B2

(12) United States Patent
Khalil et al.

(10) Patent No.: US 11,048,718 B2
(45) Date of Patent: Jun. 29, 2021

(54) METHODS AND SYSTEMS FOR FEATURE ENGINEERING

(71) Applicant: INTERNATIONAL BUSINESS MACHINES CORPORATION, Armonk, NY (US)

(72) Inventors: Elias Khalil, Atlanta, GA (US); Udayan Khurana, New York, NY (US); Fatemeh Nargesian, Toronto (CA); Horst Cornelius Samulowitz, Armonk, NY (US); Deepak S. Turaga, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 313 days.

(21) Appl. No.: 15/673,812

(22) Filed: Aug. 10, 2017

(65) Prior Publication Data

US 2019/0050465 A1 Feb. 14, 2019

(51) Int. Cl.
*G06F 16/00* (2019.01)
*G06F 16/25* (2019.01)
*G06F 16/21* (2019.01)
*G06F 16/28* (2019.01)

(52) U.S. Cl.
CPC .......... *G06F 16/258* (2019.01); *G06F 16/212* (2019.01); *G06F 16/285* (2019.01)

(58) Field of Classification Search
CPC ..... G06F 16/258; G06F 16/285; G06F 16/212
See application file for complete search history.

(56) References Cited

U.S. PATENT DOCUMENTS

| | | | | |
|---|---|---|---|---|
| 8,781,989 | B2 * | 7/2014 | Duchon | G06F 16/35 706/52 |
| 2015/0242409 | A1 * | 8/2015 | Frohock | G06F 16/21 707/620 |
| 2015/0269495 | A1 | 9/2015 | Dalessandro et al. | |
| 2016/0292578 | A1 * | 10/2016 | Ashenfelter | G06F 16/248 |
| 2017/0060988 | A1 * | 3/2017 | Kudo | G06F 16/288 |
| 2017/0063886 | A1 * | 3/2017 | Muddu | G06F 16/254 |
| 2017/0116524 | A1 | 4/2017 | Hariharan et al. | |
| 2018/0013681 | A1 * | 1/2018 | Kohout | H04L 67/02 |
| 2018/0060738 | A1 * | 3/2018 | Achin | G06Q 10/04 |

OTHER PUBLICATIONS

Ryssel et al., "Reasoning of feature models from derived features", p. 21-30 (Year: 2012).*

Trujillo et al., "Feature-oriented refinement of models, metamodels and model transformations", p. 87-94 (Year: 2009).*

(Continued)

*Primary Examiner* — Mark D Featherstone
*Assistant Examiner* — Kweku William Halm
(74) *Attorney, Agent, or Firm* — Griffiths & Seaton PLLC

(57) ABSTRACT

Embodiments for feature engineering by one or more processors are described. A plurality of transformations are applied to a set of features in each of a plurality of datasets. An output of each of the plurality of transformations is a score. For each of the sets of features, selecting those of the plurality of transformations for which said score is above a predetermined threshold. A signal representative of said selection is generated.

21 Claims, 8 Drawing Sheets

700

| DATASET | #NUMERICAL FEATURES | #DATA POINTS | BASE-DATASET | MAJORITY | BRUTE-FORCE | RANDOM (10 RUNS) | EVALUATION BASED | UNARY LFE | BINARY LFE |
|---|---|---|---|---|---|---|---|---|---|
| DATASET 1 | 10936 | 203 | 0.883 | 0.915 | 0.925 | 0.908 | - | 0.929 | 0.904 |
| DATASET 2 | 10936 | 275 | 0.724 | 0.775 | 0.801 | 0.745 | 0.788 | 0.811 | 0.775 |
| DATASET 3 | 48 | 4562 | 0.946 | 0.95 | 0.944 | 0.929 | 0.954 | 0.96 | 0.949 |
| DATASET 4 | 8 | 369 | 0.884 | 0.916 | 0.892 | 0.881 | 0.882 | 0.919 | 0.884 |
| DATASET 5 | 784 | 50000 | 0.82 | 0.5 | 0.913 | 0.5 | - | 0.819 | 0.821 |
| DATASET 6 | 6 | 690 | 0.753 | 0.647 | 0.521 | 0.643 | 0.748 | 0.771 | 0.771 |
| DATASET 7 | 2 | 100 | 0.93 | 0.939 | 0.927 | 0.909 | 0.921 | 0.961 | 0.923 |
| DATASET 8 | 8 | 768 | 0.745 | 0.694 | 0.737 | 0.719 | 0.731 | 0.762 | 0.749 |
| DATASET 9 | 9 | 100 | 0.854 | 0.872 | 0.861 | 0.832 | 0.833 | 0.873 | 0.861 |
| DATASET 10 | 5000 | 2100 | 0.941 | 0.601 | 0.741 | 0.855 | - | 0.942 | 0.933 |
| DATASET 11 | 6 | 155 | 0.747 | 0.736 | 0.753 | 0.727 | 0.814 | 0.807 | 0.831 |
| DATASET 12 | 28 | 50000 | 0.676 | 0.584 | 0.661 | 0.663 | - | 0.68 | 0.677 |
| DATASET 13 | 34 | 351 | 0.931 | 0.918 | 0.912 | 0.907 | 0.913 | 0.932 | 0.925 |
| DATASET 14 | 8 | 57 | 0.856 | 0.827 | 0.855 | 0.806 | 0.862 | 0.896 | 0.896 |
| DATASET 15 | 10936 | 138 | 0.673 | 0.664 | 0.534 | 0.666 | 0.727 | 0.757 | 0.719 |
| DATASET 16 | 500 | 780 | 0.612 | 0.549 | 0.585 | 0.551 | 0.545 | 0.617 | 0.615 |
| DATASET 17 | 37 | 253 | 0.873 | 0.874 | 0.882 | 0.869 | 0.877 | 0.894 | 0.885 |
| DATASET 18 | 8 | 768 | 0.74 | 0.687 | 0.751 | 0.726 | 0.735 | 0.745 | 0.76 |
| DATASET 19 | 590 | 470 | 0.917 | 0.917 | 0.913 | 0.915 | 0.915 | 0.918 | 0.915 |
| DATASET 20 | 60 | 208 | 0.808 | 0.763 | 0.468 | 0.462 | 0.806 | 0.801 | 0.783 |
| DATASET 21 | 57 | 4601 | 0.948 | 0.737 | 0.39 | 0.413 | 0.948 | 0.947 | 0.947 |
| DATASET 22 | 43 | 80 | 0.941 | 0.955 | 0.881 | 0.942 | 0.955 | 0.955 | 0.956 |
| DATASET 23 | 77 | 140707 | 0.964 | 0.866 | 0.946 | 0.958 | 0.963 | 0.964 | 0.964 |
| FEATURE ENGINEERING AND MODEL EVALUATION TIME (SECONDS) | GEOMEAN 2.66 AVERAGE 19.23 | | | 11.06 1219.34 | 48.54 13723.51 | 69.57 2041.52 | 403.81 10508.75 | 18.28 97.90 | 44.58 188.17 |

(56) References Cited

OTHER PUBLICATIONS

Cheng et al., "Automated Feature Generation from Structured Knowledge," CIKM'11, ACM, https://pdfs.semanticscholar.org, Oct. 24-28, 2011 (10 pages).
Zhu et al., "FeatureSmith: Automatically Engineering Features for Malware Detection by Mining the Security Literature," CCS'16, https://www.umiacs.umd.edu, Oct. 24-28, 2016 (12 pages).
Khurana et al., "Automating Feature Engineering," 30th Conference on Neural Information Processing Systems (NIPS 2016), https://workshops.inf.ed.ac.uk, 2016 (2 pages).

* cited by examiner

500 →

| TRANSFORMATION | LOG | SQRT | SQUARE | FREQ | ROUND | TANH | SIGMOID | ISOTONIC-REG | ZSCORE |
|---|---|---|---|---|---|---|---|---|---|
| # TRAINING SAMPLES | 6710 | 6293 | 5488 | 73919 | 15855 | 70829 | 70529 | 624 | 664 |
| CLASSIFIER PERFORMANCE | 0.95 | 0.96 | 0.97 | 0.77 | 0.92 | 0.92 | 0.80 | 0.98 | 0.97 |

| TRANSFORMATION | NORMALIZE | SUM | SUBT | MULT | DIV |
|---|---|---|---|---|---|
| # TRAINING SAMPLES | 31019 | 28492 | 36296 | 37086 | 19020 |
| CLASSIFIER PERFORMANCE | 0.91 | 0.98 | 0.99 | 0.97 | 0.98 |

| HAND-CRAFTED META-FEATURES | STRATIFIED SAMPLING | META-FEATURE LEARNING | QUANTILE SKETCH ARRAY |
|---|---|---|---|
| 0.5558 | 0.5173 | 0.3256 | 0.9129 |

FIG. 6

| DATASET | #NUMERICAL FEATURES | #DATA POINTS | BASE-DATASET | MAJORITY | BRUTE-FORCE | RANDOM (10 RUNS) | EVALUATION BASED | UNARY LFE | BINARY LFE |
|---|---|---|---|---|---|---|---|---|---|
| DATASET 1 | 10936 | 203 | 0.883 | 0.915 | 0.925 | 0.908 | - | 0.929 | 0.904 |
| DATASET 2 | 10936 | 275 | 0.724 | 0.775 | 0.801 | 0.745 | 0.788 | 0.811 | 0.775 |
| DATASET 3 | 48 | 4562 | 0.946 | 0.95 | 0.944 | 0.929 | 0.954 | 0.96 | 0.949 |
| DATASET 4 | 8 | 369 | 0.884 | 0.916 | 0.892 | 0.881 | 0.882 | 0.919 | 0.884 |
| DATASET 5 | 784 | 50000 | 0.82 | 0.5 | 0.913 | 0.5 | - | 0.819 | 0.821 |
| DATASET 6 | 6 | 690 | 0.753 | 0.647 | 0.521 | 0.643 | 0.748 | 0.771 | 0.771 |
| DATASET 7 | 2 | 100 | 0.93 | 0.939 | 0.927 | 0.909 | 0.921 | 0.961 | 0.923 |
| DATASET 8 | 8 | 768 | 0.745 | 0.694 | 0.737 | 0.719 | 0.731 | 0.762 | 0.749 |
| DATASET 9 | 9 | 100 | 0.854 | 0.872 | 0.861 | 0.832 | 0.833 | 0.873 | 0.861 |
| DATASET 10 | 5000 | 2100 | 0.941 | 0.601 | 0.741 | 0.855 | - | 0.942 | 0.933 |
| DATASET 11 | 6 | 155 | 0.747 | 0.736 | 0.753 | 0.727 | 0.814 | 0.807 | 0.831 |
| DATASET 12 | 28 | 50000 | 0.676 | 0.584 | 0.661 | 0.663 | - | 0.68 | 0.677 |
| DATASET 13 | 34 | 351 | 0.931 | 0.918 | 0.912 | 0.907 | 0.913 | 0.932 | 0.925 |
| DATASET 14 | 8 | 57 | 0.856 | 0.827 | 0.855 | 0.806 | 0.862 | 0.896 | 0.896 |
| DATASET 15 | 10936 | 138 | 0.673 | 0.664 | 0.534 | 0.666 | 0.727 | 0.757 | 0.719 |
| DATASET 16 | 500 | 780 | 0.612 | 0.549 | 0.585 | 0.551 | 0.545 | 0.617 | 0.615 |
| DATASET 17 | 37 | 253 | 0.873 | 0.874 | 0.882 | 0.869 | 0.877 | 0.894 | 0.885 |
| DATASET 18 | 8 | 768 | 0.74 | 0.687 | 0.751 | 0.726 | 0.735 | 0.745 | 0.76 |
| DATASET 19 | 590 | 470 | 0.917 | 0.917 | 0.913 | 0.915 | 0.915 | 0.918 | 0.915 |
| DATASET 20 | 60 | 208 | 0.808 | 0.763 | 0.468 | 0.462 | 0.806 | 0.801 | 0.783 |
| DATASET 21 | 57 | 4601 | 0.948 | 0.737 | 0.39 | 0.413 | 0.948 | 0.947 | 0.947 |
| DATASET 22 | 43 | 80 | 0.941 | 0.955 | 0.881 | 0.942 | 0.955 | 0.955 | 0.956 |
| DATASET 23 | 77 | 140707 | 0.964 | 0.866 | 0.946 | 0.958 | 0.963 | 0.964 | 0.964 |
| FEATURE ENGINEERING AND MODEL EVALUATION TIME (SECONDS) | GEOMEAN 2.66 AVERAGE 19.23 | | | 11.06 1219.34 | 48.54 13723.51 | 69.57 2041.52 | 403.81 10508.75 | 18.28 97.90 | 44.58 188.17 |

FIG. 7

METHODS AND SYSTEMS FOR FEATURE ENGINEERING

BACKGROUND OF THE INVENTION

Field of the Invention

The present invention relates in general to computing systems, and more particularly, to various embodiments for feature engineering.

Description of the Related Art

Feature engineering is the task of improving predictive modeling performance on a dataset by transforming its feature space. Existing approaches to automate this process typically rely on either transformed feature space exploration through evaluation-guided search or explicit expansion of datasets with all transformed features followed by feature selection. Such approaches incur high computational costs with respect to runtime and/or memory.

SUMMARY OF THE INVENTION

Various embodiments for feature engineering by one or more processors are described. A plurality of transformations are applied to a set of features in each of a plurality of datasets. An output of each of the plurality of transformations is a score. For each of the sets of features, selecting those of the plurality of transformations for which said score is above a predetermined threshold. A signal representative of said selection is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a table showing statistics of training samples;

FIG. 6 is a table comparing the performance of classifiers implemented in accordance with embodiments of the present invention compared to that of other classifiers;

FIG. 7 is a table comparing the predictive performance and execution time of implementations of the present invention to other feature engineering approaches;

DETAILED DESCRIPTION OF THE DRAWINGS

Figure 1:
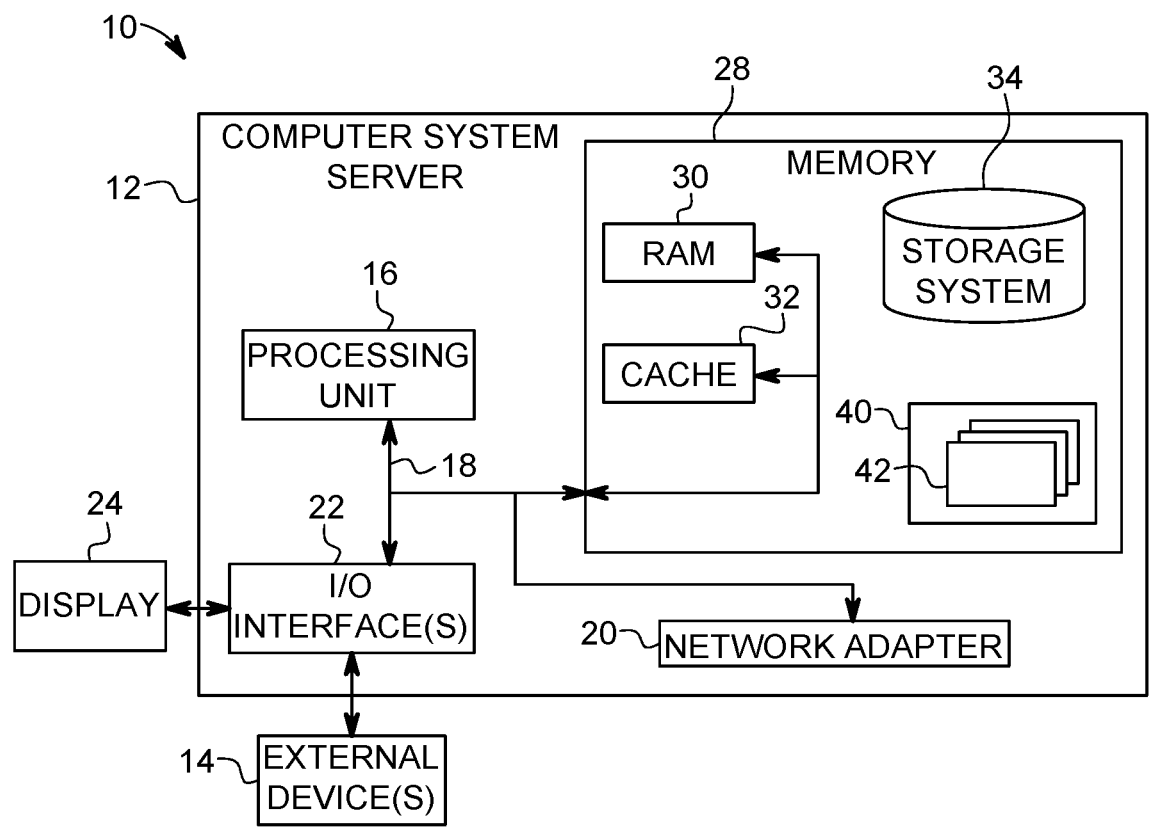
FIG. 1 is a block diagram depicting an exemplary computing node according to an embodiment of the present invention.

Feature engineering is a central task in data preparation for machine learning. It is the practice of constructing suitable features from given features that lead to improved predictive performance. The process involves the application of transformation functions, such as arithmetic and aggregate operators, on given features to generate new ones. Transformations help scale a feature or convert a non-linear relation between a feature and a target class into a linear relation, which is easier to learn.

Feature engineering is usually conducted by data scientists relying on their domain expertise and iterative trial and error and model evaluation. To perform automated feature engineering, some existing approaches adopt guided-search in feature space using heuristic feature quality measures (e.g., information gain) and other surrogate measures of performance. Others perform greedy feature construction and selection based on model evaluation. One proposed approach, Data Science Machine (DSM), considers feature engineering problems as feature selection on the space of novel features. DSM relies on exhaustively enumerating all possible features that can be constructed from a dataset, given sequences generated from a set of transformations, and then performing feature selection on the augmented dataset. Evaluation-based and exhaustive feature enumeration and selection approaches result in high time and memory cost and may lead to overfitting due to brute-force generation of features. Moreover, although deep neural networks (DNN) allow for useful meta-features to be learned automatically, the learned features are not always interpretable and DNNs are not effective learners in various application domains.

In view of the foregoing, a need exists for methods and systems that provide automatic, interpretable feature engineering for classification.

To address these needs, embodiments described herein provide methods and systems for performing automatic interpretable feature engineering for classification, based on learning from past feature engineering experiences. The various methods and/or systems described herein, or at least particular aspects thereof, may be referred to as Learning Feature Engineering (LFE). By generalizing the impact of different transformations on the performance of a large number of datasets, in some embodiments, LFE learns useful patterns between features, transforms, and targets that improve learning accuracy. Generalizing such patterns across, for example, thousands of features from hundreds of datasets may be used to successfully predict suitable transformations for features in new datasets without actually applying the transformations to those datasets. In some embodiments, LFE takes a dataset as input and recommends a set of paradigms for constructing new useful features. Each paradigm may consist of a transformation and an ordered list of features on which the transformation is suitable.

In some embodiments, Multi-Layer Perceptron (MLP) classifiers, each corresponding to a transformation, are used. Given a set of features and class labels, the classifier predicts whether the transformation can derive a more useful feature than the input features. Some embodiments described herein consider the notion of feature and class relevance in the context of a transformation as the measure of the usefulness of a pattern of feature value and class label distributions and transformation.

Numerical features typically contain a variable number of distinct values in various ranges. One challenge in generalizing across different datasets is to convert feature values and their class labels to a fixed size feature vector representation that can be fed into LFE classifiers. To characterize datasets, hand-crafted meta-features, fixed-size stratified sampling, neural networks, and hashing methods have been used for different tasks. However, these representations do not directly capture the correlation between feature values and class labels. To capture such correlations, in some embodiments, LFE constructs a stack of fixed-size representations of feature values per target class. In some embodiments, quantile data sketch is used to represent feature values of each class, which provides a fixed-size space representation and achieves reasonably accurate approximation to the distribution function induced by the data being sketched.

Figure 8:
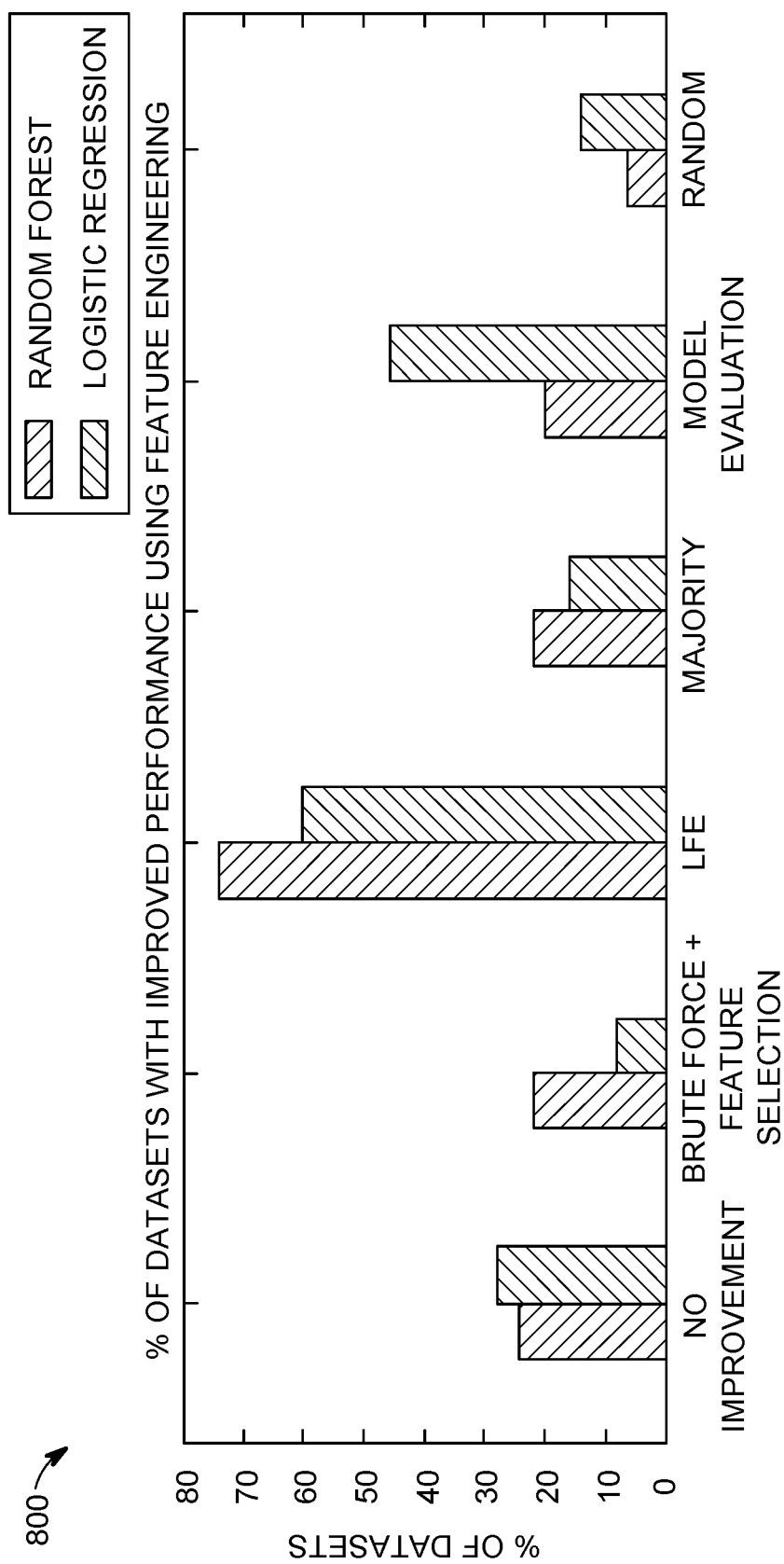
FIG. 8 is a graph comparing the predictive performance of several feature engineering approaches.

LFE presents a computationally efficient and effective alternative to other automated feature engineering approaches by recommending suitable transformations for features in a dataset. As described in greater detail below, to demonstrate the capabilities of LFE, an implementation thereof was trained with over 84,000 features, that were extracted from 900 datasets, for ten unary transformations and 122K feature pairs, four binary transformations, and two models: Random Forest and Logistic Regression. LFE was empirically compared with a suite of feature engineering approaches proposed in the literature or applied in practice (such as the Data Science Machine, evaluation-based, random selection of transformations and always applying the most popular transformation in the training data) on a subset of 50 datasets from the University of California-Irvine Machine Learning Repository (UCI repository), Open Media Library (OpenML), and other sources. The experiments show that, of the datasets that demonstrated any improvement through feature engineering, LFE was the most effective in nearly 90% of the cases. As shown in FIG. 8, similar results were observed for the LFE trained with Logistic Regression. Moreover, LFE runs in significantly lesser time compared to the other approaches. This also enables interactions with a practitioner since it recommends transformations on features in a short amount of time.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, network PCs, and servers. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
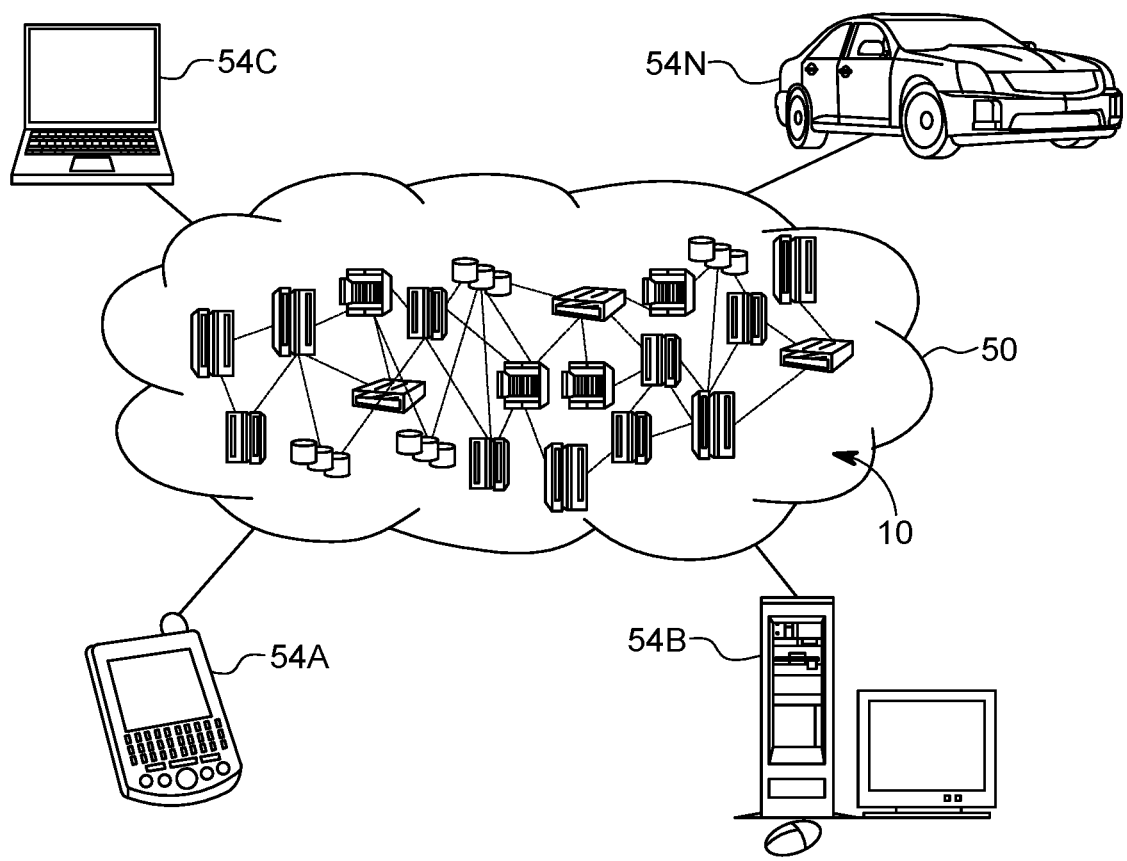
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
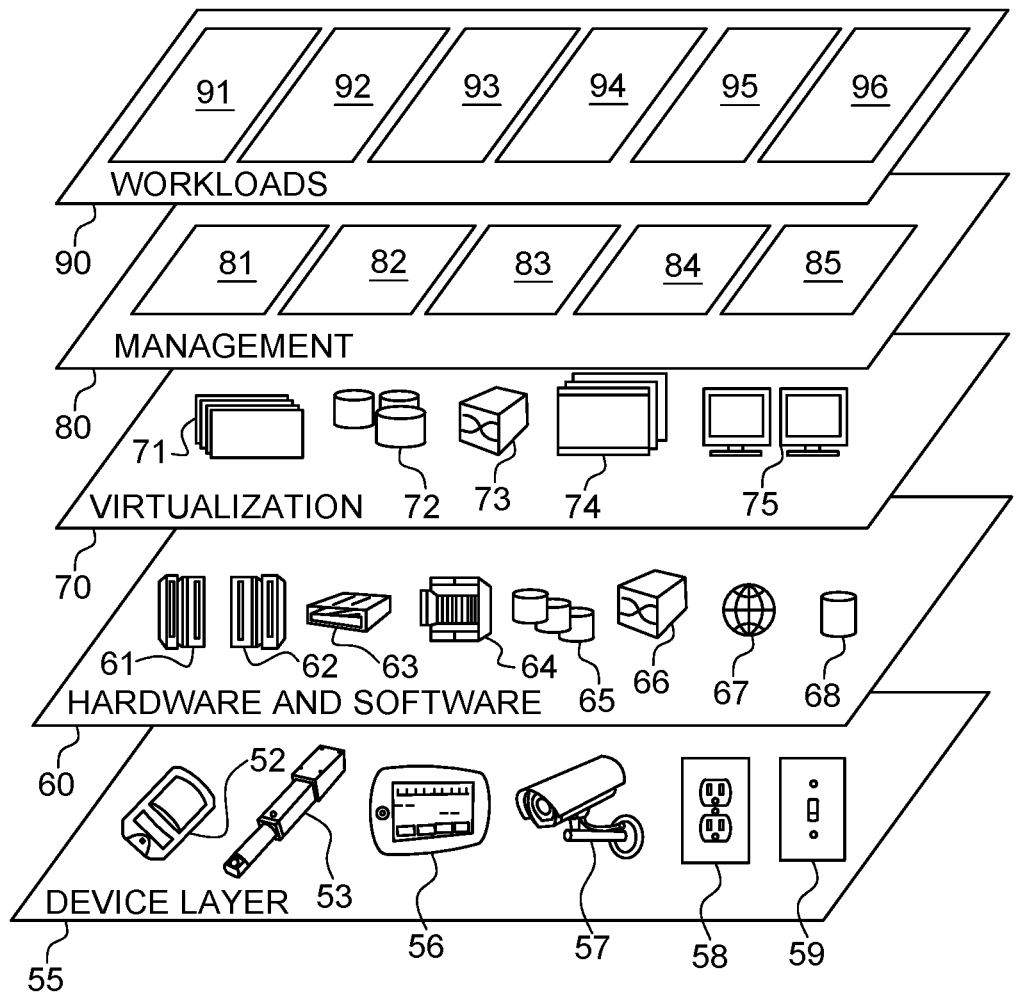
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for feature engineering as described herein. One of ordinary skill in the art will appreciate that the workloads and functions 96 for feature engineering may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for feature engineering by one or more processors. A plurality of transformations are applied to a set of features in each of a plurality of datasets. An output of each of the plurality of transformations is a score. For each of the sets of features, selecting those of the plurality of transformations for which said score is above a predetermined threshold. A signal representative of said selection is generated (e.g., an electronic message, saving the selected transformations on a memory, etc.).

After "scoring" the transformations as applied to "training" features/datasets, and saving/storing the results thereof, the methods and systems described herein may receive new, different datasets (and/or features) as input and recommend a set of paradigms (and/or transformations) for constructing new useful features. Each paradigm may consist of a transformation and an ordered list of features on which the transformation is suitable.

The applying of the plurality of transformations to each of the sets of features may include generating a representation of each of the sets of features and applying each of the plurality of transformations to the representation. The representation generated for each of the sets of features may be a non-parametric representation. The generating of the representation for each of the sets of features may include normalizing values associated with the respective set of features and partitioning the values into multiple bins of equal size.

The features within the datasets may be numerical features. The applying of the plurality of transformations to each of the sets of features may include modeling each of the plurality of transformations as a multi-class classification problem. The applying of the plurality of transformations to each of the sets of features may include modeling each of the plurality of transformations as a multilayer perceptron (MLP).

Various aspects and details of various embodiments of methods and/or systems described herein (i.e., LFE) are described in greater detail below.

Consider a dataset D with features'=$\{f_1, \ldots, f_n\}$ and a target class x, a set of transformations T=$\{T_1, \ldots, T_m\}$, and a classification task L. The feature engineering problem is to find q best paradigms for constructing new features such that by adding them to D as new features, the performance of L on D is maximized. Each paradigm consists of a candidate transformation $T_c \in T$ of arity r, an ordered list of features $[f_i, \ldots, f_{i+r-1}]$, and a usefulness score.

For a dataset with n features and with u unary transformations, $O(u \times n)$ new features can be constructed. With b binary transformations, there are $O(b \times P_2^n)$ new possible features. Given a fixed set of transformations, the number of new features and their combinations to explore, for an exact solution, grows exponentially. As such, mere enumeration and trial by model training and testing may not be a computationally practical option, and a scalable solution to the problem may be one that avoids this computational bottleneck. In some embodiments described herein, LFE reduces the complexity of feature space exploration by providing an efficient approach for finding a particularly "good" transformation for a given set of features. Therefore, in some embodiments, given n features, for unary and binary transformations, $O(n)$ and $O(P_2^n)$ transformation predictions are performed, respectively.

In some embodiments, in order to assess the relative impact of adding new features across different techniques, as many new features as those originally in the data (i.e., q=n) are added. For unary transformations, LFE may predict the most suitable transformation for each feature. For binary and higher arity transformations, in some embodiments, a random sample of all combinations of features is considered, the paradigm for each combination is found, and the top-k useful ones are selected. As described below, the methods and systems described herein learn and predict useful transformations for features.

In some embodiments, the problem of predicting a useful r-ary transformation $T_c \in T_r$, ($T_r$ is the set of r-ary transformations in T) for a given list of features $[f_1, \ldots, f_r]$ is modeled as a multi-class classification problem, where the input is a representation of features, $R_{[f_1, \ldots, f_r]}$, and output classes are transformations in $T_r$. At least some embodiments described herein take a one-vs-rest approach. Each transformation may be modeled as a Multi-Layer Perceptron (MLP) binary classifier with real-valued confidence scores as output. Recommending an r-ary transformation for r features involves applying all $|T_r|$ MLPs on $R_{[f_1, \ldots, f_r]}$. If the highest confidence score obtained from classifiers is above a given threshold, the corresponding transformation may be recommended to be applied on feature f. For example, assume $g_k(R_{[f_1, \ldots, f_r]})$ is the confidence score of the MLP corresponding to transformation $T_k$, and γ is the threshold for confidence scores which is determined empirically. In such an instance, the transformation $T_c$, for features $[f_1, \ldots, f_r]$, may be recommended as follows:

$$c = \underset{k}{\mathrm{argmax}}\, g_k(R_{[f_1,\ldots,f_r]}) \quad (1)$$

$$\mathrm{recommend:} \begin{cases} T_c, & \text{if } g_c(R_{[f_1,\ldots,f_r]}) > \gamma \\ \text{none}, & \text{otherwise} \end{cases}$$

In some embodiments, numerical features are represented to be input of transformation MLPs as described below, as is the process of collecting past feature engineering knowledge as training samples to train MLPs.

Generally, transformations are used to reveal and improve significant correlation or discriminative information between features and class labels. The more pronounced this correlation, the more likely it is that the model will achieve significant predictive performance. In some embodiments, each LFE classifier learns the patterns of feature-class distributions for which the corresponding transformation has been effective in improving feature-class correlation. Feature f in a dataset with k classes may be represented as follows:

$$R_f \times [Q_f^{(1)}; Q_f^{(2)}; \ldots ; Q_f^{(k)}] \quad (2)$$

where $Q_f^{(i)}$ is a fixed-sized representation of values in f that are associated with class i. This representation may be referred to herein as "Quantile Sketch Array (QSA)". As described below, feature values associated to class i are translated into representation $Q_f^{(i)}$, which is intended to capture the distribution of feature values.

Neural networks have been successful in learning representations for image and speech data. Others have proposed solutions for estimating a Probability Distribution Function (PDF) in an n-dimensional space. However, it is not clear how existing representation learning and PDF learning approaches may be applied in the context of raw numerical data. The main challenges are the high variability in the size and the range of feature values (e.g., from 10 to millions). In at least some embodiments described herein, features are data points represented with various numbers of dimensions (i.e., numbers of distinct feature values). As such, Random Projection for dimensionality reduction is not applicable. Although Recurrent Neural Networks are capable of dealing with varying input size, some embodiments described herein may determine a fixed-size representation that captures the correlation between features and target classes.

Previous approaches have used hand-crafted meta-features, including information-theoretic and statistical meta-features, to represent datasets. Such meta-features attempt to model the distribution of values in datasets. Performing fixed-size sampling of feature values is another approach for representing distributions. Samples extracted from features and classes are required to reflect the distribution of values in both feature and target classes. While stratified sampling solves the issue for one feature, it becomes more complex for multiple features with high correlation. Feature hashing has been used to represent features of type "string" as feature vectors. Although feature hashing may be generalized for numerical values, it is not straightforward to choose distance-preserving hash functions that map values within a small range to the same hash value. The performance of LFE transformation classifiers, using the representations described above, is empirically shown below.

In some embodiments described herein, LFE, or more specifically Quantile Sketch Array is used, as is commonly understood in the art, to represent feature values associated with a class label. Quantile data sketch is a non-parametric representation that enables characterizing the approximate Probability Distribution Function of values. Quantile data sketch is related to the concept of a histogram, where data is summarized into a small number of buckets (or bins). Previous methodologies used quantile representation for numerical features to perform feature classification. In some embodiments described herein, the exact brute-force approach is applied to compute quantile sketch for numerical values.

Assume $V_k$ is the bag of values in feature f that are for the training data points with the label $c_k$ and $Q_f^{(i)}$ is the quantile sketch of $V_k$. First, these values are normalized to a pre-defined range [lb, ub]. Generating $Q_f^{(i)}$ involves bucketing all values in $V_k$ into a set of bins. Given a fixed number of bins, r, the range [lb, ub] is partitioned into r disjoint bins of uniform width $$w = \frac{ub - lb}{r}.$$

Assume the range [lb, ub] is partitioned into bins $\{b_0, \ldots, b_{r-1}\}$, where the bin b is a range [lb+j*w, lb+(j+1)*w]. Function $B(v_l)=b_j$ associates the value $v_l$ in $V_k$ to the bin $b_j$. Function $P(b_j)$ returns the number of feature values that are bucketed in $b_j$. Finally, $$I(b_j) = \frac{P(b_j)}{\sum_{0 \leq m < r} P(b_m)}$$

is the normalized value of $P(b_j)$ across all bins. If it is assumed that each bin is a pixel, the representation of feature values is an image where the intensity of pixel j is $I(b_j)$. In other words, considering Equation 2, a feature is represented as a set of images, one per class label.

Figure 4:
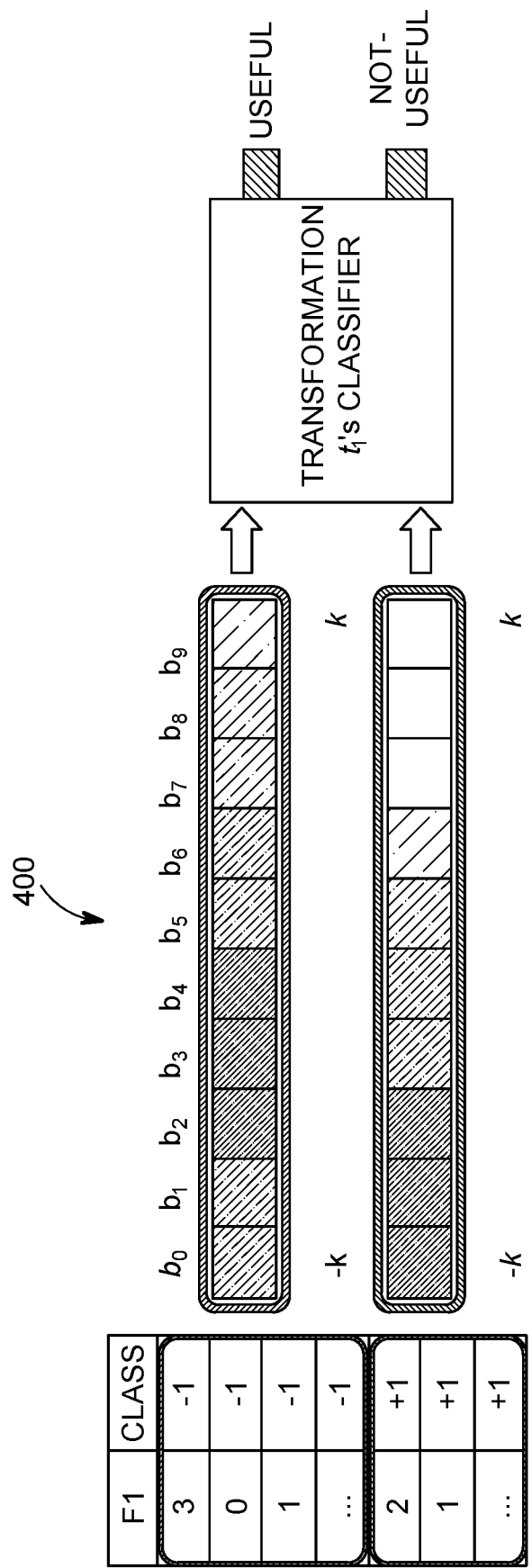
FIG. 4 is a block/flow diagram of a representation of a feature according to an embodiment of the present invention.

To illustrate, FIG. 4 shows an example of a representation 400 of a feature according to an embodiment of the present invention. The feature f1's values are binned into ten, equi-width bins, separately for classes −1 and +1. The two resulting vectors are then concatenated and fed into the transformation $t_i$'s classifier, which in turn returns confidence scores for or against applying $t_i$ on f1. It should be noted that this representation has certain behaviors. For example, for feature values perfectly separated in terms of the class label, the representation ends up being very similar regardless of the scale of feature values. In this particular case, there is also no need for any transformation since values are already separated. In some embodiments, QSA parameters (number of bins and normalization range) are chosen/selected based on the performance of classifiers through empirical observations.

To generate training samples for transformation MLP classifiers, some embodiments described herein consider numerical features in classification datasets across various repositories. Each classifier may be trained with the samples for which the corresponding transformation has been found useful as positive samples and all other samples as negative. In order to decide whether a transformation for a set of features leads to improvement, consider a selected model, L, evaluated on the original features and the target class, as well as the constructed feature by itself and the target class. If the constructed feature shows performance improvement beyond a threshold, θ, the input features together with their class labels are considered as a "positive" training sample for the transformation classifier.

A sample generated from feature f, in a dataset with k classes, for transformation t is translated into $R_f = [Q_f^{(1)}, \ldots, Q_f^{(k)}]$. Assuming b bins are used for each quantile data sketch, $R_f$ is a vector of size k×b. Then, $R_f$ is fed into the MLP corresponding to t. Assume the corresponding MLP to the unary transformation t has one hidden layer with h units. The probability of t being a useful transformation or not for feature f in a dataset is computed as:

$$[p_{t\ is\ useful}(f), p_{t\ is\ not\ useful}(f)] = \sigma_2(b^{(2)} + W^{(2)}(\sigma_1(b^{(1)} + W^{(1)}[Q_f^{(1)}; \ldots ; Q_f^{(k)}]))) \quad (3)$$

where $W^{(1)}$ and $W^{(2)}$ are weight matrices, $b^{(1)}$ and $b^{(2)}$ are bias vectors, and $\sigma_1$ and $\sigma_2$ are softmaxe and rectifier activation functions, respectively. In some embodiments, Stochastic Gradient Descent with minibatches, as is commonly understood, is used to train transformation MLPs. To prevent overfitting, regularization and drop-out, as are commonly understood in the art, may be applied. Note that the generated training samples are model-dependent. In other words, while there may be overlaps in the suggested feature engineering paradigms across models, the optimal use of LFE for a specific model comes from using that same model while training LFE.

In a series of experiments, three aspects of the methods and systems described herein were evaluated: (1) the impact of using QSA representation on the performance of transformation classifiers compared to other representations, (2) the capability of the methods/systems to recommend useful transformations, and (3) the benefit of using the methods/systems to perform feature engineering compared to other alternatives, in prediction accuracy and time taken. The transformation classifiers and the meta-feature learner (autoencoder) were implemented in TensorFlow, as is commonly understood. Transformation computation and model training were implemented using scikit-learn, as is commonly understood. To illustrate the capabilities of embodiments of the present invention, the following ten unary and four binary transformations were considered: log, square-root (both applied on the absolute of values), frequency (i.e., the count of how often a value occurs), square, round, tan h, sigmoid, isotonic regression, zscore, normalization (i.e., mapping to [−1, 1]), sum, subtraction, multiplication and division. In order to avoid data leakage, transformations on train and test folds were applied separately.

Without the loss of generality, for the purpose of the experiments, binary classification was focused on. 900 classification datasets were collected from, for example, the OpenML and UCI repositories to train transformation classifiers. A subset of 50 datasets was reserved for testing and not used for the purpose of training. In order to better utilize the datasets, the multi-class problems were converted into one-vs-all binary classification problems. Training samples were generated for Random Forest and Logistic Regression using 10-fold cross validation and the performance improvement threshold, θ, of 1%. Different improvement thresholds result in collecting a variable number of training samples. Since the distribution of collected samples for transformations is not uniform, the threshold was selected based on empirical exploration. Approximately 84,500 training samples for unary transformation and 122,000 for binary transformations were generated. FIG. 5 shows a table 500 reporting the statistics of positive training samples generated from all datasets. Frequency and multiplication are two transformations that incur performance improvement for the majority of features. The average time to train transformation classifiers offline was 6 hours.

The performance of classifiers implemented in accordance with embodiments described herein (e.g., using QSA) compared to that of classifiers that use alternative representations for feature values associated with a class label is depicted in table 600 shown in FIG. 6.

For hand-crafted meta-feature representation, the following meta-features used in the literature were considered: first 30 moments of feature values, median, standard deviation, min, max, number of values and its log. For sampling representation, 250 stratified random samples per class were obtained. Meta-feature learning was also performed by training an auto-encoder on all features in the evaluation. The input and output of the auto-encoder are the feature hashing representation of features with 200 hash values per class. The auto-encoder consisted of a two-layer encoder and a two-layer decoder, which are symmetric and each have a layer of 100 units connected to another layer of 75 units. For a hashed input feature, the output of the encoder component of a trained auto-encoder as learned meta-features of the feature was considered. Finally, for QSA, we consider a normalization range of [−10, 10] and a quantile data sketch size of 200 bins.

The same set of samples was used for training classifiers of different representations, and the MLPs were tuned to have their best possible configuration. In order to overcome the imbalance data classification problem, as shown in table 500 in FIG. 5, the minority class samples were duplicated to have balanced negative and positive samples during the training phase. The average 10-fold cross validation F1-score of a subset of classifiers is shown in FIG. 6 as a proxy of the benefit of representations. As shown, there is a clear distinction in terms of predictive performance and employed representation. The poorest results were obtained by learned meta-features, possibly because feature values belong to various ranges and hashing representation is not distance preserving. Therefore, it is challenging for the auto-encoder to learn useful meta-features. Hand-crafted meta-features perform better, however, QSA outperforms other representations by a significant margin (i.e., 35.7%).

To evaluate the predictive power of each classifier, classifiers corresponding to unary and binary transformations were trained using 10-fold cross validation on all training samples. During the test phase, the corresponding transformation of each classifier was applied on one or a pair of feature(s) and the F1 score of the model based on the transformed feature only is evaluated. The F1 Score of classifiers using Random Forest and improvement threshold 1%, are shown in table 500 in FIG. 5. 0/1 loss evaluation was considered. Table 500 in FIG. 5 demonstrates the high predictive capability of the transformation classifiers described herein. As a baseline, a random transformation recommender converged to a F1 score of 0.50 for all transformation classifiers.

To demonstrate the benefits of the disclosed embodiments in recommending useful features, a comparison of the predictive performance of test datasets augmented with features engineered by LFE and features engineered by the following approaches was performed: Random, which iterates for a given r runs and in each run recommends a random or no transformation for feature(s). The performance of the dataset augmented with features constructed by randomly selected transformations is evaluated in each run and the transformations in the run with the highest predictive performance are recommended; Majority, which always recommends the single most effective transformation in the training samples (i.e. frequency for unary and multiplication for binary transformations); Brute-force, inspired by the Feature Synthesis component of Data Science Machine, enumerates the whole feature space by applying all transformations to all features and performs feature selection on the augmented dataset; Model evaluation-based, which chooses the useful transformation for a feature by model evaluation on each constructed feature by each transformation. Having t unary transformations, this approach performs t model training runs for each feature.

To compare the disclosed embodiments with other feature engineering approaches, 50 binary classification datasets were considered. The detailed statistics of 23 of the test datasets are shown in table 700 in FIG. 7. Test datasets have a diverse range in number of features (i.e., between 2 and 10,936) and data points (i.e., between 57 and 140,707). All experimental evaluations are based on 10-fold cross validation on a Random Forest model. Since the methods/systems described herein consider both feature values and class labels, in order to avoid a data leakage problem, the entire dataset may not be considered when the recommendations are computed. In some embodiments, for experiments with unary transformations for each fold, at most one transformation is recommended for each feature in the train data fold. Next, recommended transformations are applied on the corresponding features of the test data fold and added as new features to the dataset. To only analyze the capability of feature engineering approaches, no feature selection is performed, except for brute-force approach to which feature selection is essential.

Table 700 in FIG. 7 shows a comparison of the predictive performance and execution time of disclosed embodiments to other feature engineering approaches on test datasets. All columns in this table, except the last, indicate results when using unary transformations. Since 50% of datasets time out for evaluation-based approach and 62% for brute-force approach, only the performance of the disclosed embodiments for binary transformations is shown. All reported times in table 700 include preparing data, recommending transformations, applying transformations and model training. As shown, LFE consistently outperforms all approaches on most datasets at a small cost of execution time. No feature engineering approach results in improvement of dataset 20, dataset 21, and dataset 23. The evaluation-based approach on dataset 1, dataset 5, dataset 10 and dataset 12 timed out due to the excessive number of model training calls. Since the evaluation-based approach requires model training for each combination of feature and transformation, the evaluation-based approach is only applicable to datasets with a small number of features and data points.

To broaden the scope of experiments, feature engineering was performed using the same approaches and setting of table 700 on 50 test datasets. FIG. 8 illustrates a graph 800 showing the percentage of test datasets, from a sample of 50, whose predictive performance improved (i.e., as measured by F1 score of 10-fold cross validation on a Random Forest and Logistic Regression model) by each feature engineering approach. For Random Forest, it was observed that for 24% of test datasets, none of the considered approaches, including LFE, may improve classification performance. In all remaining datasets, LFE improved the predictive performance, and for 89% of such datasets, LFE generates features that result in the highest classification performance. For the remaining 11% of datasets, the higher performance is achieved by other approaches at higher computational cost than LFE. To investigate the robustness of LFE with respect to the model, experiments for Logistic Regression and similar results were performed and observed. While LFE is a one-shot approach it achieves an average improvement of more than 2% in F1 score and a maximal improvement of 13% across the 50 test datasets.

As such, a framework is presented for performing automated feature engineering by learning patterns of features, class labels, and transformations from historical data. Through a novel representation (i.e., QSA) for characterizing variable-sized features belonging to different datasets, prediction of useful feature transformations is possible. Empirical evaluation demonstrates the efficacy and efficiency of the methods and/or systems in improving the predictive performance at low computational costs for a variety of classification problems.

Figure 9:
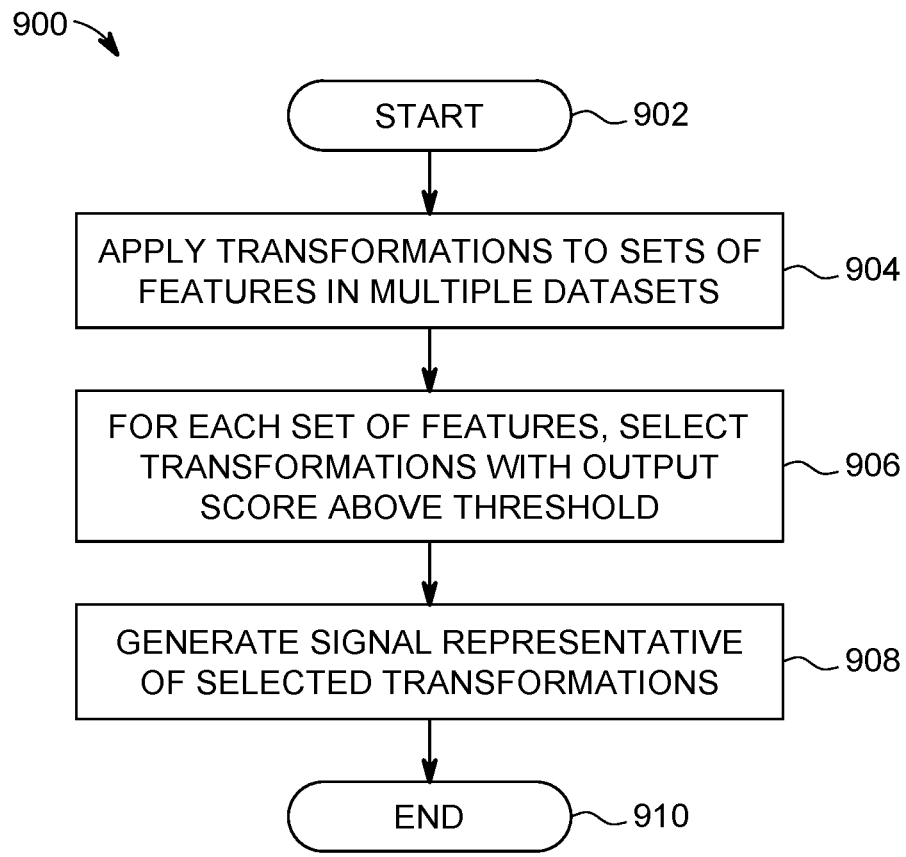
FIG. 9 is a flowchart diagram depicting an exemplary method for feature engineering in which various aspects of the present invention may be implemented.

Turning to FIG. 9, a flowchart diagram of an exemplary method 900 for feature engineering, in accordance with various aspects of the present invention, is illustrated. Method 900 begins (step 902) with, for example, multiple sets of features being selected for training purposes. That is, the sets of features may be selected because it is believed that training an implementation of the methods/systems described herein with those sets of features may be beneficial for predictive performance of future feature sets. The features within the datasets may be numerical features.

A plurality of transformations are applied to a set of features in each of a plurality of datasets (i.e., the datasets/features selected for training) (step 904). In some embodiments, an output of each of the plurality of transformations is a score. As described above, the applying of the plurality of transformation to each of the sets of features may include generating a representation of each of the sets of features and applying each of the plurality of transformations to the representation. The representation generated for each of the sets of features may be a non-parametric representation. The generating of the representation for each of the sets of features may include normalizing values associated with the respective set of features and partitioning the values into multiple bins of equal size.

The applying of the plurality of transformations to each of the sets of features may include modeling each of the plurality of transformations as a multi-class classification problem. The applying of the plurality of transformations to each of the sets of features may include modeling each of the plurality of transformations as a multilayer perceptron (MLP).

For each of the sets of features, those of the plurality of transformations for which said score is above a predetermined threshold are selected (step 906). A signal representative of the selected transformations is generated (step 908). For example, a directory or index of the transformations, along with which of the datasets the transformations are considered to be "positive" (i.e., scored above the threshold), may be stored on a memory or server (and later accessed/utilized when so desired) and/or transmitted via electronic communication (e.g., email), etc.

Method 900 ends (step 910) with, for example, the completion of the applying and/or selection of the appropriate transformations and/or the transformations being accessed for later use on additional datasets/features (e.g., used to successfully predict suitable transformations for features in new datasets without actually applying the transformations to those new datasets).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for feature engineering, comprising:
   applying a plurality of transformations to a set of features in each of a plurality of datasets, wherein an output of each of the plurality of transformations is a score;
   for each of the sets of features, selecting those of the plurality of transformations for which said score is above a predetermined threshold;
   generating a signal representative of said selection; wherein generating the signal includes storing the selected ones of the plurality of transformations; and
   upon receiving a new dataset notwithstanding prior to receiving any user input associated with the plurality of transformations and the set of features for the new dataset, predictably recommending those of the stored transformations and an ordered list, according to the respective score, of the set of features detected in the new dataset on which the stored transformations are suitable for the new dataset, wherein the predictably recommending includes, with respect to unary transformations, predicting one or more of those of the stored transformations having a highest score above the predetermined threshold for each of the set of features detected in the new dataset, and, with respect to binary and higher arity transformations, predicting a selected number of those of the stored transformations having the score above the predetermined threshold for a selected random sample taken from all combinations of the set of features detected in the new dataset.

2. The method of claim 1, wherein the applying of the plurality of transformations to each of the sets of features includes generating a representation of each of the sets of features and applying each of the plurality of transformations to the representation.

3. The method of claim 2, wherein the representation generated for each of the sets of features is a non-parametric representation.

4. The method of claim 3, wherein the generating of the representation for each of the sets of features includes normalizing values associated with the respective set of features and partitioning the values into multiple bins of equal size.

5. The method of claim 1, wherein said features are numerical features.

6. The method of claim 5, wherein the applying of the plurality of transformations to each of the sets of features includes modeling each of the plurality of transformations as a multi-class classification problem.

7. The method of claim 6, wherein the applying of the plurality of transformations to each of the sets of features includes modeling each of the plurality of transformations as a multilayer perceptron (MLP).

8. A system for feature engineering, comprising:
   at least one processor that
      applies a plurality of transformations to a set of features in each of a plurality of datasets, wherein an output of each of the plurality of transformations is a score;
      for each of the sets of features, selects those of the plurality of transformations for which said score is above a predetermined threshold;
      generates a signal representative of said selection; wherein generating the signal includes storing the selected ones of the plurality of transformations; and
      upon receiving a new dataset notwithstanding prior to receiving any user input associated with the plurality of transformations and the set of features for the new dataset, predictably recommends those of the stored transformations and an ordered list, according to the respective score, of the set of features detected in the new dataset on which the stored transformations are suitable for the new dataset, wherein the predictably recommending includes, with respect to unary transformations, predicting one or more of those of the stored transformations having a highest score above the predetermined threshold for each of the set of features detected in the new dataset, and, with respect to binary and higher arity transformations, predicting a selected number of those of the stored transformations having the score above the predetermined threshold for a selected random sample taken from all combinations of the set of features detected in the new dataset.

9. The system of claim 8, wherein the applying of the plurality of transformations to each of the sets of features includes generating a representation of each of the sets of features and applying each of the plurality of transformations to the representation.

10. The system of claim 9, wherein the representation generated for each of the sets of features is a non-parametric representation.

11. The system of claim 10, wherein the generating of the representation for each of the sets of features includes normalizing values associated with the respective set of features and partitioning the values into multiple bins of equal size.

12. The system of claim 8, wherein said features are numerical features.

13. The system of claim 12, wherein the applying of the plurality of transformations to each of the sets of features includes modeling each of the plurality of transformations as a multi-class classification problem.

14. The system of claim 13, wherein the applying of the plurality of transformations to each of the sets of features includes modeling each of the plurality of transformations as a multilayer perceptron (MLP).

15. A computer program product for feature engineering by one or more processors, the computer program product comprising a non-transitory computer-readable storage medium having computer-readable program code portions stored therein, the computer-readable program code portions comprising:
    an executable portion that applies a plurality of transformations to a set of features in each of a plurality of datasets, wherein an output of each of the plurality of transformations is a score;
    an executable portion that, for each of the sets of features, selects those of the plurality of transformations for which said score is above a predetermined threshold;
    an executable portion that generates a signal representative of said selection; wherein generating the signal includes storing the selected ones of the plurality of transformations; and
    an executable portion that, upon receiving a new dataset notwithstanding prior to receiving any user input associated with the plurality of transformations and the set of features for the new dataset, predictably recommends those of the stored transformations and an ordered list, according to the respective score, of the set of features detected in the new dataset on which the stored transformations are suitable for the new dataset, wherein the predictably recommending includes, with respect to unary transformations, predicting one or more of those of the stored transformations having a highest score above the predetermined threshold for each of the set of features detected in the new dataset, and, with respect to binary and higher arity transformations, predicting a selected number of those of the stored transformations having the score above the predetermined threshold for a selected random sample taken from all combinations of the set of features detected in the new dataset.

16. The computer program product of claim 15, wherein the applying of the plurality of transformations to each of the sets of features includes generating a representation of each of the sets of features and applying each of the plurality of transformations to the representation.

17. The computer program product of claim 16, wherein the representation generated for each of the sets of features is a non-parametric representation.

18. The computer program product of claim 17, wherein the generating of the representation for each of the sets of features includes normalizing values associated with the respective set of features and partitioning the values into multiple bins of equal size.

19. The computer program product of claim 15, wherein said features are numerical features.

20. The computer program product of claim 19, wherein the applying of the plurality of transformations to each of the sets of features includes modeling each of the plurality of transformations as a multi-class classification problem.

21. The computer program product of claim 20, wherein the applying of the plurality of transformations to each of the sets of features includes modeling each of the plurality of transformations as a multilayer perceptron (MLP).

\* \* \* \* \*